United States Patent
Badhya

(10) Patent No.: US 9,518,812 B2
(45) Date of Patent: Dec. 13, 2016

(54) SELF-ADJUSTING DOOR THICKNESS INDICATOR

(71) Applicant: Schlage Lock Company LLC, Indianapolis, IN (US)

(72) Inventor: Rohith Badhya, Bangalore (IN)

(73) Assignee: Schlage Lock Company LLC, Indianapolis, IN (US)

( * ) Notice: Subject to any disclaimer, the term of this patent is extended or adjusted under 35 U.S.C. 154(b) by 125 days.

(21) Appl. No.: 14/599,382

(22) Filed: Jan. 16, 2015

(65) Prior Publication Data

US 2016/0209198 A1    Jul. 21, 2016

(51) Int. Cl.
  *G01C 5/06* (2006.01)
  *G01B 5/06* (2006.01)

(52) U.S. Cl.
  CPC .................................. *G01B 5/06* (2013.01)

(58) Field of Classification Search
  CPC .......................................................... G01B 5/06
  USPC .................................. 33/194, 832, 833, 836
  See application file for complete search history.

(56) References Cited

U.S. PATENT DOCUMENTS

| | | | |
|---|---|---|---|
| 3,513,556 A | 5/1970 | Holland | |
| 3,721,010 A | 3/1973 | Ristow | |
| 4,165,566 A * | 8/1979 | Lycan | G01B 3/20 33/542 |
| 4,952,101 A * | 8/1990 | Coombs | B23B 47/287 33/667 |
| 5,006,799 A | 4/1991 | Pfanstiehl | |
| 5,027,068 A | 6/1991 | Young et al. | |
| 5,094,009 A | 3/1992 | Koch et al. | |
| 6,295,070 B1 | 9/2001 | Wood | |
| 6,536,263 B1 | 3/2003 | Wood et al. | |
| 8,336,225 B1 | 12/2012 | Zhang | |
| 2005/0183281 A1 * | 8/2005 | Kennedy | G01B 3/22 33/833 |
| 2008/0104855 A1 * | 5/2008 | Kim | G01B 3/28 33/836 |
| 2011/0000344 A1 | 1/2011 | Summers | |
| 2012/0090188 A1 * | 4/2012 | Chang | B60B 29/00 33/833 |
| 2012/0124847 A1 * | 5/2012 | Chamberlain | B43L 13/028 33/41.5 |
| 2014/0251062 A1 * | 9/2014 | Snodgrass | F16C 1/226 74/502.4 |
| 2014/0265376 A1 | 9/2014 | Walls et al. | |

(Continued)

*Primary Examiner* — G. Bradley Bennett
(74) *Attorney, Agent, or Firm* — Taft Stettinius & Hollister LLP

(57) ABSTRACT

An apparatus for setting a lock assembly to accommodate a thickness of a door. The apparatus may include a housing that is sized for placement in an opening in the door and an adjustment member that is structured for at least selective axial displacement about the housing. At least a portion of the adjustment member may be structured for placement adjacent to an outside portion of the door. The apparatus may include an indicator assembly having an indicator gauge that is biased against the adjustment member by a biasing element. The indicator portion is structured for axial displacement about the housing via the axial displacement of the adjustment member. The indicator assembly may also include a cover having an opening that provides a visual access point for an indicium of the indicator gauge.

20 Claims, 5 Drawing Sheets

(56) References Cited

U.S. PATENT DOCUMENTS

2015/0260497 A1* 9/2015 Haczynski ............... B25H 7/00
33/701

* cited by examiner

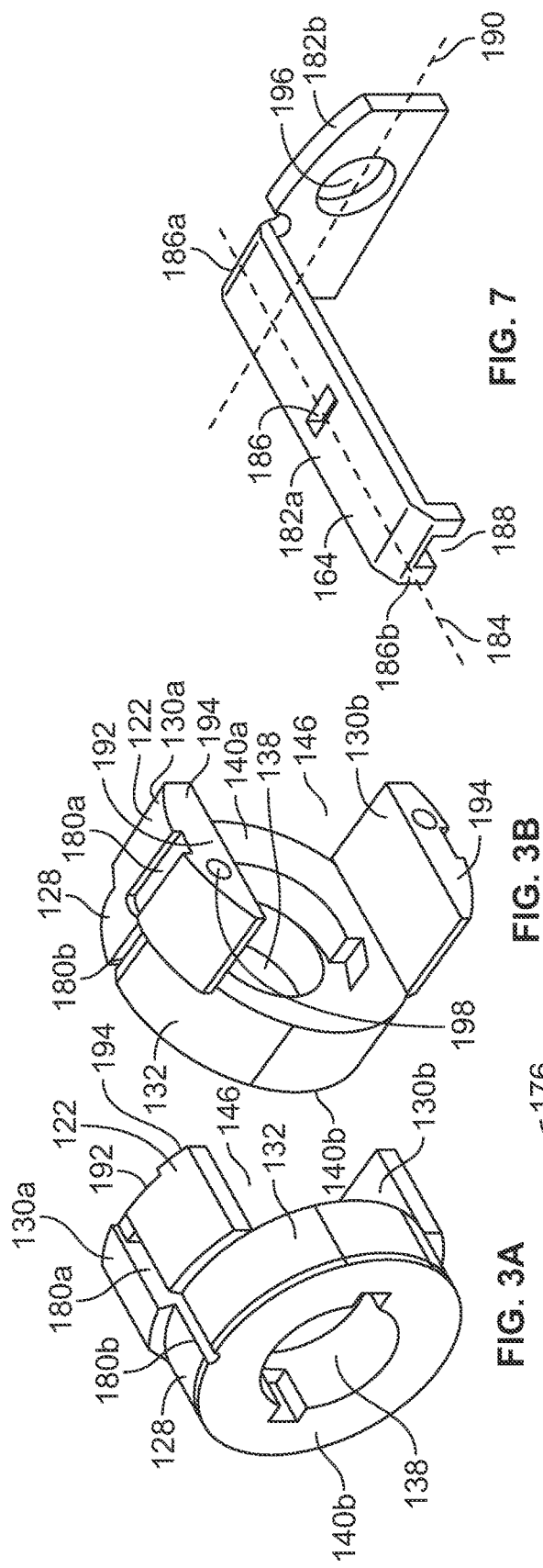

SELF-ADJUSTING DOOR THICKNESS INDICATOR

BACKGROUND

Embodiments of the present invention generally relate to door thickness indicators. More particularly, but not exclusively, embodiments of the present invention relate to self-adjusting door thickness indicators for cylindrical locks.

Cylindrical locksets typically include a cylindrical lock chassis having, a transverse centerline. During installation, regardless of the thickness of the door in which the lockset is being installed, the transverse centerline of the lock chassis should usually coincide with the centerline of the door thickness. If this installation criterion is not met, the lockset may fail to function properly. Therefore, lock chassis may have an adjustable configuration that allows the lock chassis to be appropriately aligned with a variety of door thicknesses. For example, the position of the lock body relative to an associated mounting plate or mounting flange may be adjustable. Yet, difficulties in making accurate assessments of the current door thickness setting, or of distinguishing between alternative settings, can lead to the use of incorrect settings and wasted effort. Likewise, the occurrence of inadvertent changes from factory preset conditions during shipping or handling can lead to errors or necessitate additional steps of validation and correction.

BRIEF SUMMARY

An aspect of the present invention is an apparatus having an outside housing, at least a portion of the outside housing being structured for placement within an opening in a door. The apparatus may also include an adjustment plate that is structured for at least selective axial displacement about at least a portion of the outside housing. Further, at least a portion of the adjustment plate may be structured for placement adjacent to an outer surface of the door. Additionally, the apparatus may include an indicator assembly having an indicator gauge and a biasing element. The indicator gauge includes a plurality of indicium corresponding to a thickness of the door. Further, at least a portion of the indicator gauge is structured for axial displacement along one or more channels of the outside housing. The indicator gauge is axially displaced by the axial displacement of the adjustment plate, and the biasing element is structured to bias the indicator gauge against the adjustment plate. The indicator assembly may also include a cover having an opening that provides a visual access point for an indicium of the indicator gauge.

Another aspect of the present invention is an apparatus for setting a lock assembly to accommodate a thickness of a door. The apparatus may include a housing, at least a portion of the housing being sized for placement in an opening in the door. The apparatus may also include an adjustment member that is structured for at least selective axial displacement about the housing. Further, at least a portion of the adjustment member is structured for placement adjacent to an outside portion of the door. Additionally, the apparatus may include an indicator assembly having an indicator gauge and a biasing element. The indicator gauge may include an indicator portion and a leg portion, the indicator portion having a plurality of indicium corresponding to a thickness of the door. The indicator portion is structured for axial displacement about the housing via the axial displacement of the adjustment member. Additionally, the biasing element is structured to bias at least a portion of the leg portion against the adjustment member. The indicator assembly may also include a cover having an opening that provides a visual access point for an indicium of the indicator gauge.

Another aspect of the present invention is an apparatus comprising an outside housing sized for insertion in an opening in a door. The outside housing may include a hub portion and at least one arm portion, the at least one arm portion having a first channel and the hub portion having a second channel. The apparatus may also include an adjustment plate having a flange portion and an annular portion, the flange portion structured for placement adjacent to an outer surface of the door. Further, the adjustment plate is structured to threadingly engage the hub portion. Additionally, the apparatus includes an indicator assembly having, an indicator gauge and a biasing element. The indicator gauge has an indicator portion and a leg portion, the indicator portion having a plurality of indicium that corresponds to a thickness of the door. Further, the indicator portion is sized for slideable displacement within the first channel. The leg portion extends from the indictor portion and is sized for slideable displacement within the second channel, and includes an extension that is structured to extend above the second channel. The biasing element is adapted for placement in the first channel, and is structured to exert a biasing force to press at least the extension of the leg portion against a portion of the annular portion of the adjustment plate.

BRIEF DESCRIPTION OF THE DRAWINGS

The description herein makes reference to the accompanying figures wherein like reference numerals refer to like parts throughout the several views.

FIGS. 3A and 3B illustrate an inner side view and an outer side perspective view, respectively, of an outside housing of a lock chassis according to an illustrated embodiment of the present invention.

FIG. 5 illustrates a side perspective view of an indicator portion of an indicator assembly according to an illustrated embodiment of the present invention.

FIG. 6 illustrates a side perspective view of a biasing element for an indicator assembly according to an illustrated embodiment of the present invention.

FIG. 7 illustrates a side perspective view of a cover for an indicator assembly according to an illustrated embodiment of the present invention.

DESCRIPTION OF THE ILLUSTRATED EMBODIMENTS

Figure 1:
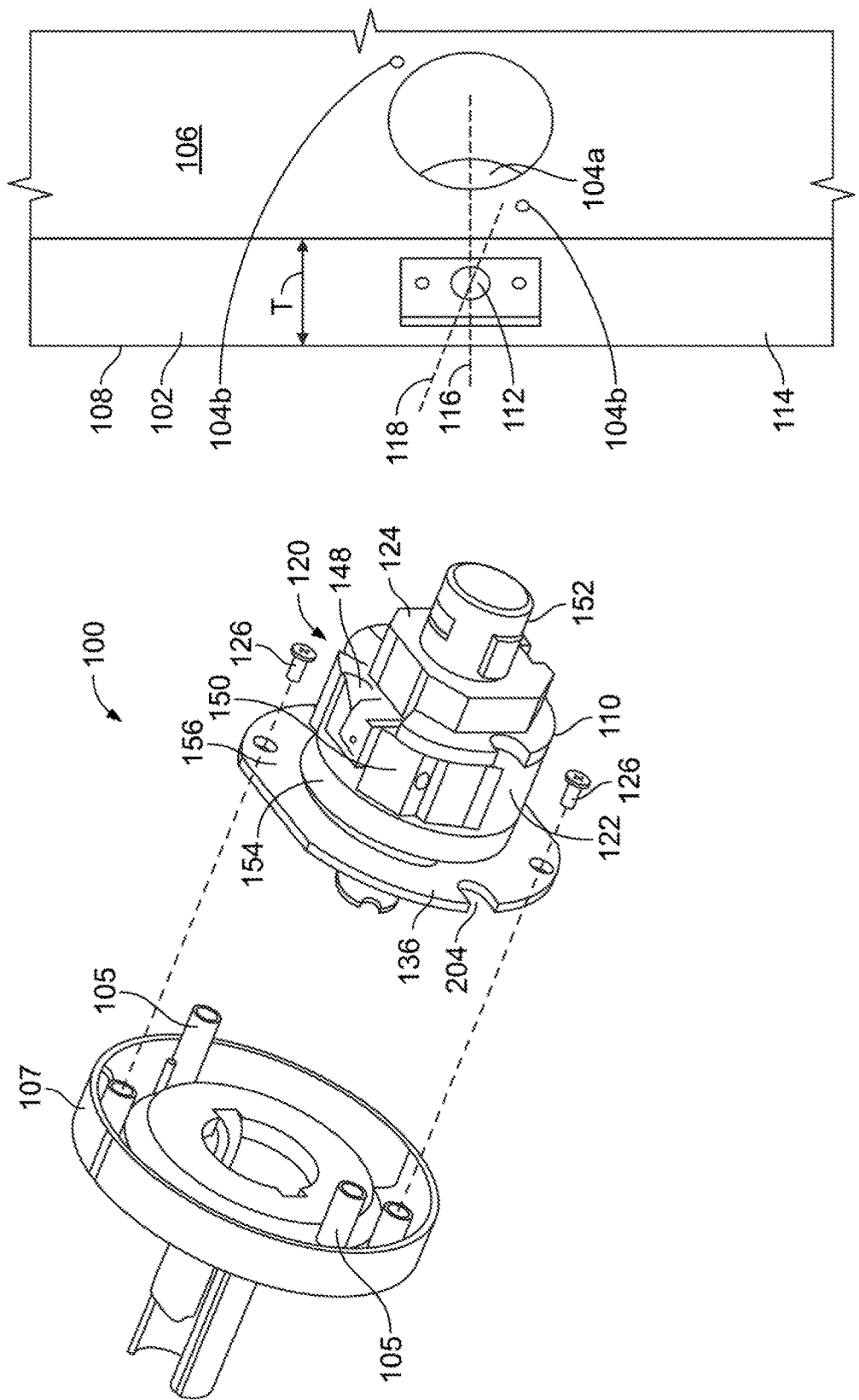
FIG. 1 is an exploded side view of a portion of an exemplary lock assembly that is to be secured to a door.

Certain terminology is used in the foregoing description for convenience and is not intended to be limiting. Words such as "upper," "top," "first," and "second" designate directions in the drawings to which reference is made. This terminology includes the words specifically noted above, derivatives thereof; and words of similar import. Additionally, the words "a" and "one" are defined as including one or more of the referenced item unless specifically noted. The phrase "at least one of" followed by a list of two or more items, such as "A, B or C," means any individual one of A, B or C, as well as any combination thereof.

FIG. 1 is an exploded view of a portion of an exemplary lock assembly 100 that is structured to be secured to a door 102. The door 102 may include one or more openings 104a, 104b that extend through a thickness of the door 102 (as indicated by "T" in FIG. 1), such as, for example, extend between an inside wall 106 and an outside wall 108 of the door 102. The openings 104a, 104b may be sized to receive at least a portion of the lock assembly 100 and/or to facilitate the mounting of the lock assembly 100 to the door 102. For example, as shown in FIG. 1, at least one of the openings 104a is a cylindrical hole that sized to receive at least a portion of a lock chassis 110 of the lock assembly 100, while at least another opening 104b provides a mounting hole that may receive one or more fasteners, such as, for example, bolts or screws and/or a mating connector for a fastener, such as, for example, a nut or an internal threaded post, flange, or projection. For example, according to certain embodiments, openings 104b may be sized to receive at least a portion of an internally threaded post 105 of a spring cage assembly 107 and at least a portion of the mating screw or bolt. The door 102 may also include a latch hole 112 that extends through a side edge 114 of the door 102 along a latch axis 116 that is generally perpendicular to the longitudinal axis 118 of the cylindrical hole or opening 104a of the door 102. Further, the latch hole 112 may be in fluid communication with die cylindrical hole or opening 104a.

Figure 2:
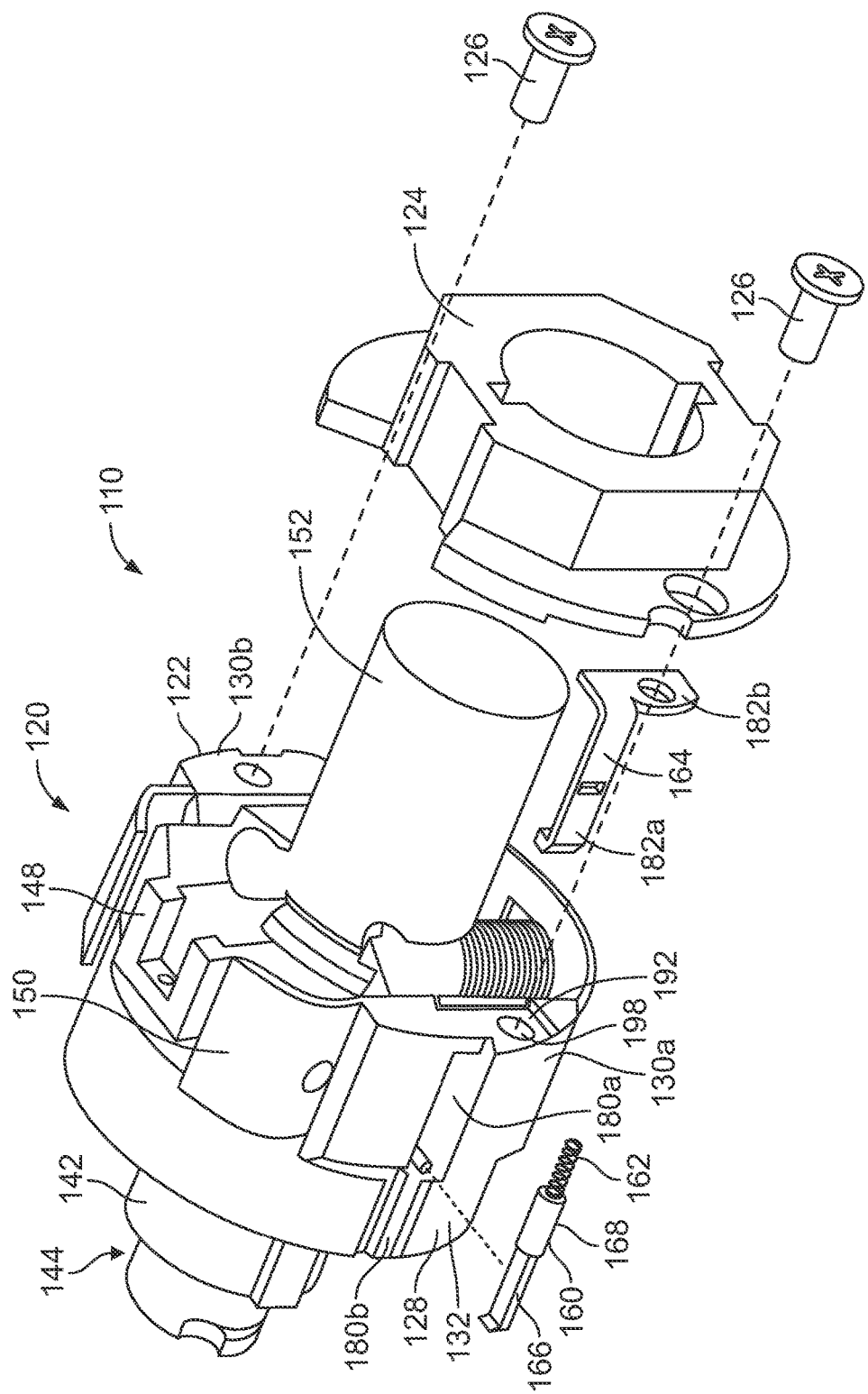
FIG. 2 illustrates a partial exploded side view of a lock chassis assembly and an indicator assembly according to an illustrated embodiment of the present invention.
Figure 4A:
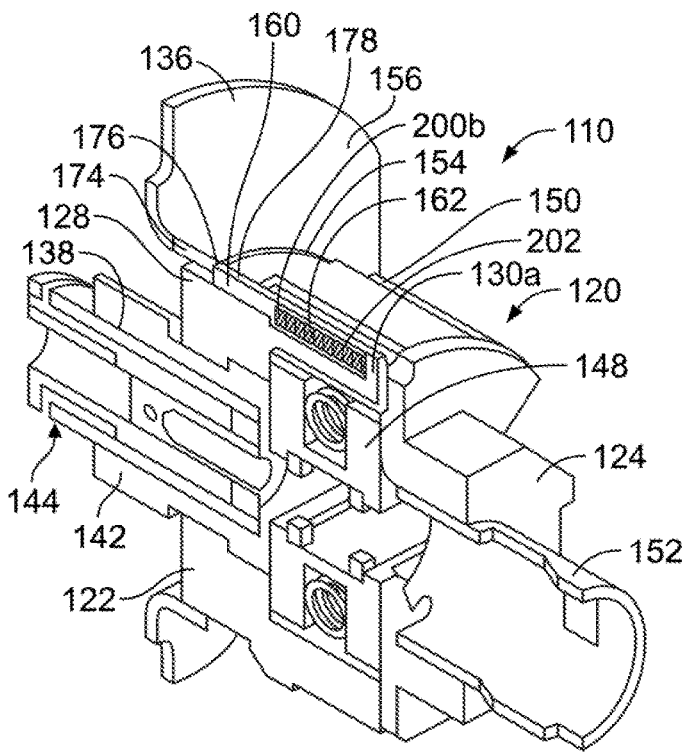
FIGS. 4A and 4B illustrate a partial cross sectional view and a side view, respectively, of the portion of the exemplary lock assembly shown in FIG. 1.

The lock chassis 110 includes a body portion 120 comprising an outside housing 122 and an inside hub 124. As shown in FIGS. 1 and 2, according to certain embodiments, the inside hub 124 can be secured to the outside housing 122 via one or fasteners 126, including, for example, mounting bolts or screws. Additionally, as shown in at least FIGS. 2-3B, the outside housing 122 has a hub portion 128 and one or more arm portions 130a, 130b. The hub portion 128 may have an outer all 132 that generally defines an outer periphery of the hub portion 128 and which extends between first and second ends 134a, 134b of the hub portion 128. According to certain embodiments, at least a portion of the outer wall 132 may have an external thread that is structured for threaded engagement with an adjustment member, such as, for example, but not limited to, an adjustment plate 136, as discussed below. Further, the hub portion 128 may include an inner aperture 138 that extends between the first and second ends 140a, 140b of the hub portion 128. As illustrated in FIG. 4A, according to certain embodiments, at least a portion of an outside spindle 142 and a key cam assembly 144 can be rotatably captured within at least the inner aperture 138 of the hub portion 128 so as to be in operable engagement with a portion of a slide assembly of the lock assembly 100.

The one or more arms 130a, 130b may extend from the first end 140a and/or the second end 140b of the hub portion 128. According to the illustrated embodiment, the one or more arms 130a, 130b comprise opposing first and second arms 130a, 130b that generally extend from the first end 140a of the hub portion 128. Further, the opposing first and second arms 130a, 130b may be positioned to provide a slot 146 therebetween, as shown in FIGS. 3A and 3B. In the illustrated embodiment, the slot 146 may be in fluid communication with the inner aperture 138 of the hub portion 128. Additionally, the slot 146 may be sized to receive placement of at least a portion of the slide assembly, such as, for example, at least a portion of a slide 148 and a slide clip 150. Additionally, an inside spindle 152 can be rotatably captured in the inside hub. 124 and extend into the slot 146 so as to be in operable engagement with an inside portion of the slide assembly, such as, for example, an inside portion of the slide 148.

In the illustrated embodiment, the lock chassis 110 includes an adjustment plate 136 that includes an annular portion 154 and a flange 156. The adjustment plate 136 may threadingly engage the lock chassis 110 such that rotation of the adjustment plate 136 may displace the axial position of the adjustment plate 136 at least relative to the lock chassis 110. For example, according to the illustrated embodiment, at least the annular portion 154 and/or the flange 156 of the adjustment plate 136 may have an internal thread that mates an external thread on the outer wall 132 of the hub portion 128 of the outside housing 122.

As shown in at least FIGS. 5-8, the lock assembly 100 also includes an indicator assembly 158 that is adapted to provide an indication of the thickness of the door 102 between an inside wall 106 and an outside wall 108 of the door 102 (as indicated by "T." in FIG. 1) and/or provides an indication of the door thickness that at least certain components of the lock assembly 100 are currently set/positioned to accommodate. For example, according to certain embodiments, the indicator assembly 158 may provide an indication of based on the axial position of the adjustment plate 136, the door thickness that lock chassis 110 is currently set to accommodate. The indicator assembly 158 may also provide an indication of whether adjustments in one or more settings of the lock chassis 110, such as, for example, adjustments in the axial position of the adjustment plate 136, has adjusted the lock chassis 110 to an extent that the lock chassis 110 is set to accommodate a particular door thickness, or whether those settings or components, are to be further adjusted.

According to the illustrated embodiment, the indicator assembly 158 includes an indicator gauge 160, a biasing element 162, and a cover 164. As shown by FIG. 5, in the illustrated embodiment, the indicator gauge 160 includes a leg portion 166 and an indicator portion 168. The indicator portion 168 may include a side wall 170 that extends between a first end 171a and a second end 171b of the indicator portion 168 and that generally defines an outer periphery of the indictor portion 168. The side wall 170 of the indicator portion 168 may have a variety of different shapes and sizes. For example, according to the illustrated embodiment, the side wall 170 of the indicator portion 168 may have a generally cylindrical shape. Further, according to certain embodiments, at least a top portion 172 of the side wall 170 may include a plurality of indicia that is indicative of the thickness of the door 102. A variety of different types of indicia may be employed. For example, in the embodiment shown in FIG. 5, the indicia may be numeric representations of the thickness of the door 102, as measured in inches, such as, for example "2⅛", "2", "1¾", and "1⅝".

Further, as shown, in the illustrated embodiment, as the indicia progresses further away from the first end 171a of the indicator portion 168, the numeric values of the indicia decreases, thereby providing an indication that at least certain components of the lock assembly 100 may be set or positioned to accommodate a variety of door thicknesses, as discussed in more detail below.

In the illustrated embodiment, the leg portion 166 of the indicator gauge 160 extends from the second end 171b of the indicator portion 168 to a foot portion 174 of the leg portion 166. The leg portion 166 may, or may not, have a shape or size similar to the indicator portion 168. For example, in the illustrated embodiment, while the indicator portion 168 has a generally cylindrical shape, the leg portion 166 is generally rectangular in shape. According to certain embodiments, the leg portion 166 may be shaped to prevent or resist rotational displacement of the indicator gauge 160 so as to prevent the indicia (if any) on the indicator portion 168 of the indicator gauge 160 from being rotated to a position that may not be readily visually accessible during, at least setting and/or installation of the lock assembly 100. Further, according to certain embodiments, the foot portion 174 may include an extension 176 that extends above an upper surface 178 of the leg portion 166. The extension 176 may provide a surface or area of the indicator gauge 160 that is at least biased into engagement with the adjustment plate 136 by a biasing force from the biasing element 162, as discussed below.

Figure 4B:
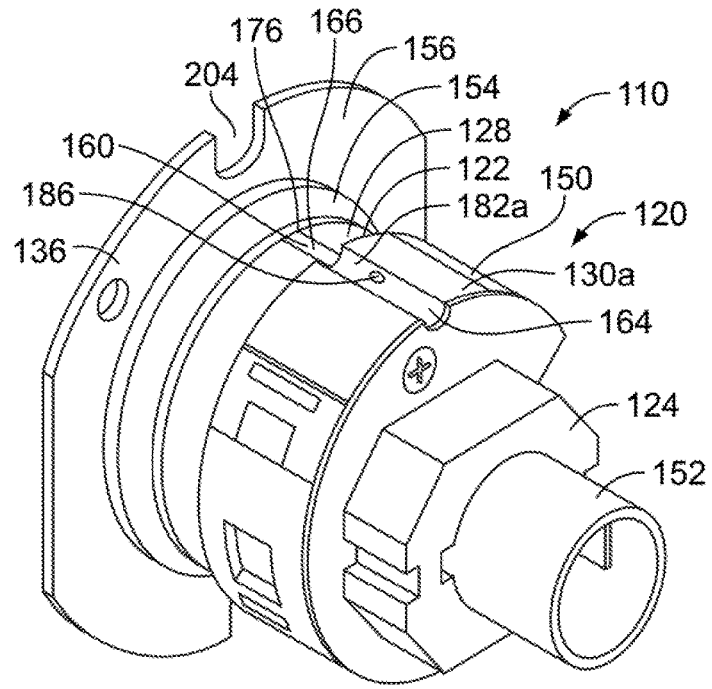
Figure 8:
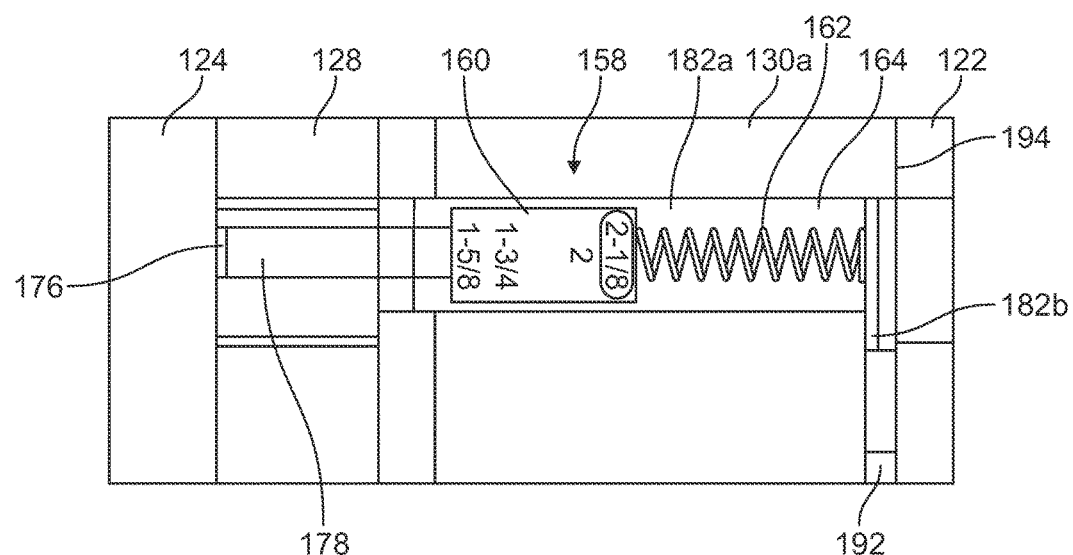
FIG. 8 illustrates a top view of an exemplary indicator assembly positioned within one or more channels of an outside housing of a lock chassis and with a cover of the indicator assembly shown in phantom view.

As shown in at least FIGS. 3A and 3B, the outside housing 122 may include one or more channels 180a, 180b that are adapted to accommodate the axial displacement of the indicator gauge 160. For example, the outside housing 122 may include a first channel 180a that is positioned within a portion of the first arm 130a and which is sized to receive the placement of at least the indicator portion 168 of the indicator gauge 160 and the biasing element 162, as shown in FIG. 8. As illustrated in FIG. 6, according to certain embodiments, the biasing element 162 may be a spring, such as, for example, a coil spring. Additionally, a second channel 180b may extend through the outer wall 132 of the hub portion 128 and be sized to receive the slideable placement of at least a portion of the leg portion 166. Further, according to the illustrated embodiment, at least a portion of the second channel 180b may generally align with the first channel 180a. Further, the leg portion 166 of the indicator gauge 160 may be structured such that, when the leg portion 166 is positioned within the second channel 180b, at least the foot portion 174 extends out of the second channel 180b and away from the hub portion 128 such that the foot portion 174 is positioned to contact an adjacent portion of the annular portion 154 of the adjustment plate 136, as shown in FIGS. 4A and 4B.

The cover 164 may be configured to cover at least a portion of the indicator portion 168 of the indicator gauge 160 and/or at least a portion of the one or more channels 180a, 180b. According to the illustrated embodiment, the cover 164 may include a first portion 182a and a second portion 182b. As illustrated in FIG. 7, the first portion 182a of the cover 164 may extend along a first longitudinal axis 184 from a first end 186a to a second end 186b. Additionally, when the lock assembly 100 is positioned within the cylindrical hole or opening 104a in the door 102, the first longitudinal axis 184 of the first portion 182a may be generally parallel to the longitudinal axis 118 of the opening 104a. At least a portion of the first portion 182a of the cover 164 may be adapted to be positioned over and/or in the first channel 180a so as to cover at least a portion of the indicator portion 168 and the biasing element 162, as shown in at least FIG. 8. Further, according to certain embodiments, at least a portion of the first end 186a may extend beyond the first channel 180a and/or the arm portions 130a, 130b. Additionally, the first portion 182a of the cover 164 may include an opening or window 186 that that is positioned to provide a location for visual access to indicium on the indicator portion 168 that is indicative of the thickness of the door 102, as discussed below.

The second end 186b of the first portion 182a of the cover 164 may include a recess 188 that is sized to receive the slideable passage of at least a portion of the leg portion 166 of the indicator gauge 160. Moreover, as the axial position of the indicator gauge 160 within the channels 180a, 180b is adjusted, as discussed below, at least a portion of the leg portion 166 may slide through the recess 188 and into, or out of the first channel 180a.

According to certain embodiments, the second portion 182b of the cover 164 may extend away from the first end 186a of the first portion 182a along, a second longitudinal axis. 190 that is generally perpendicular to, and may or may not intersect, the first longitudinal axis. 184 of the first portion 182a. Further the second portion 182b may be structured to be positioned in a groove 192 in a face portion 194 of at least one arm portion 130a. The groove 192 and/or second portion 182b may be sized to prevent or minimize the second portion 182b from extending beyond adjacent portions of the face portion 194 of an arm portion 130a in the general direction of the inside hub 124. The second portion 182b may also include an orifice 196 that is generally aligned with an opening 198 in the arm portion 130a that is adapted to receive a fastener that may secure the second portion 182b, and thus the cover 164, to the arm portion 130a.

The second portion 182b may provide a surface against which a first end 200a of the biasing element 162 may abut when the indicator assembly 158 is operably positioned on the outside housing 122. The opposing second end 200b of the biasing element 162 may abut against the indicator portion 168 of the indicator gauge 160. According to certain embodiments, the second end 200b of the biasing element 162 may abut against the first end 171a of the indicator portion 168 of the indicator gauge 160. However, as shown by at least FIGS. 4A and 5, according to certain embodiments, the indicator portion 168 may include an aperture 202 that extends through the first end 171a of the indicator portion 168, and which is sized to receive insertion of at least a portion of the biasing element 162. According to such an embodiment, at least a portion of the biasing element 162 may extend into, and abut against, an inner portion of the indicator portion 168. Additionally, as discussed below, the biasing element 162 is structured to provide a force that biases the axial position of the indicator gauge 160 away from the second portion 182b and toward and/or against a portion of the annular portion 154 of the adjustment plate 136.

During installation of the lock assembly 100, the lock chassis 110 is inserted into the cylindrical hole or opening 104a of the door 102. The flange 156 of the adjustment plate 136 is to be positioned to abut against, or otherwise be adjacent to, the outside wall 108 of the door 102 at a location at which slots 204 in the flange aligned with the mounting holes or openings. 104b in the door 102. However, as different doors may have different thicknesses, the position of the flange 156, and thus the axial position of the adjustment plate 136, relative to other portions of the lock chassis 110, including the outside housing 122, may be adjusted to set at least the lock chassis 110 to accommodate the particular thickness of the door 102 on which the lock assembly 100 is being installed. As previously discussed, according to the illustrated embodiment, the axial position of the adjustment plate 136 may be adjusted, if necessary, via use of the threaded engagement between the adjustment plate 136 and the hub portion 128 of the outside housing 122. Moreover, when the adjustment plate 136 is threadingly engaged with the hub portion 128, rotation of the adjustment plate 136 about the hub portion 128 may alter the axial position of the adjustment plate 136 relative to the hub portion 128. For example, rotation of the adjustment plate 136 in a first direction may axially displaced the adjustment plate 136 toward the inside hub 124, while rotation of the adjustment plate 136 in a second, opposite direction, may axially displaced the adjustment plate 136 away from the inside hub 124.

With the indicator assembly 158 operably positioned within the one or more channels 180a, 180b and the adjustment plate 136 threadingly engaging the hub portion 128, the biasing element 162 of the indicator assembly 158 may bias the indicator gauge 160 toward the adjustment plate 136 so that the foot portion 174 of the indicator gauge 160 is pressed against an adjacent portion of the annular portion 154 of the adjustment plate 136, as shown in at least FIGS. 4A and 4B. Thus, as the indicator gauge 160 is biased into engagement with the adjustment plate 136, adjustment of the axial position of the adjustment plate 136 may alter the position of the indicator gauge 160 within the one or more channels 180a, 180b in the outside housing 122. Further, by adjusting the position of the indicator gauge 160 within the channels. 180a, 180b, the indicium that is viewable through the opening 186 in the first portion 182a of the cover 164 may change. Further, the axial position of the adjustment plate 136 relative to the opening 186 in the first portion 182a of the cover 164 may correspond to a particular door thickness, with that thickness being reflected by the particular indicium on the indicator portion 168 that is viewable though the opening 186 in the first portion 182a of the cover 164. Thus, according to the illustrated embodiment, adjusting the axial position of the adjustment plate 136 relative to at least the hub portion 128 of the outside housing 122 may adjust the axial position of at least the indicator portion 168 of the indicator gauge 160 within the first channel 180a. However, the axial position of the cover 164 may remain relatively static during adjustment of the axial position of the indicator portion 168 within the first channel 180a. Accordingly, as the axial position of the indicator portion 168 within the first channel 180a is adjusted, the particular indicium on the indicator portion 168 that is viewable through the opening 186 in the first portion 182a of the cover 164 may change. Further, again, the positioning of the opening 186, the adjustment plate 136, and the indicia on the indicator portion 168 may be used to provide an indication of the lock chassis 110 being set for installation in/on a door that has a particular door thickness. Thus, the position of the adjustment plate 136 about the hub portion 128 of the outside housing 122 may provide an indication of the door thickness of the door 102, as reflected by the indicium on the indicator portion 168 of the indicator gauge 160 that is viewable through the opening 186 of the cover, as shown for example, by FIG. 9.

Figure 9:
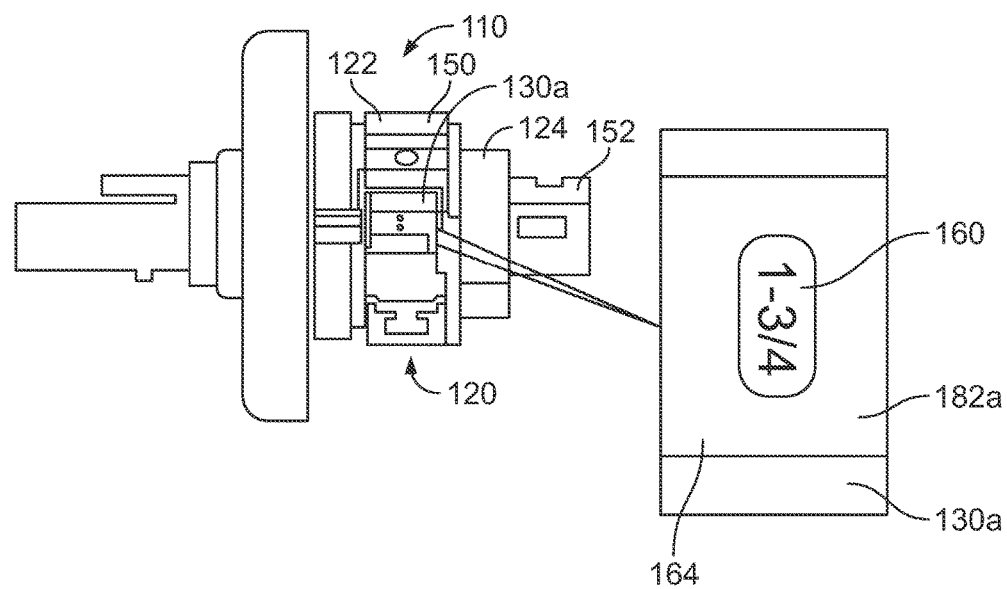
FIG. 9 illustrates a side view of an exemplary lock assembly having an indicator assembly wherein the adjustment plate is positioned to accommodate a door having a door thickness of 1¾ inches The foregoing summary, as well as the following detailed description of certain embodiments of the present invention, will be better understood when read in conjunction with the appended drawings. For the purpose of illustrating the invention, there is shown in the drawings, certain embodiments. It should be understood, however, that the present

Thus, for example, when the axial position of the adjustment plate 136 is to be adjusted to set the lock chassis 110 to accommodate a door thickness that is thinner or smaller than that for which the lock chassis 110 is eminently set, the adjustment plate 136 may be rotated about the hub portion 128 in a first direction. As the adjustment plate 136 is rotated about the hub portion 128 in the first direction, the adjustment plate 136 is axially displaced generally toward the inside hub 124. Further, as at least the foot portion 174 of the indicator gauge 160 abuts against the annular portion 154 of the adjustment plate 136, the displacement of the adjustment plate 136 provides a force against at least the foot portion 174 that axially displaces the indicator gauge 160 in the same axial direction as the adjustment plate 136. Further, such axial displacement of the indicator gauge 160 in a direction generally toward the inside hub 124 further compresses the biasing element 162. As the indicator gauge 160 is displaced generally in a direction toward the inside hub 124, the position of the indicator portion 168 relative to the opening 186 in the cover 164 may be altered, thereby altering which indicium on the indicator portion 168 may be viewable through the opening 186 in the cover 164. For example, referencing FIG. 8, as the indicator portion 168 is displaced toward the inside hub 124, the indicium that is viewable through the opening 186 in the cover may change from "2⅛" inches, as shown in FIG. 8, to "1¾" inches, as shown in FIG. 9, and continue to decrease if the adjustment plate 136 continues to be displaced in a direction generally toward the inside hub 124.

According to the illustrated embodiment, when the setting of at least the lock chassis 110 is to be adjusted to enhance the ability of the lock chassis 110 to accommodate a door thickness that is thicker or larger than that for which the lock chassis 110 is currently set, the adjustment plate 136 may be rotated about the hub portion 128 in a second direction, the second direction being opposite to the first direction. As the adjustment plate 136 is rotated about the hub portion 128 in the second direction, the adjustment plate 136 is axially displaced generally away from the inside huh 124. Further, as the adjustment plate 136 is moved in an axial direction generally away from the inside hub 124, the biasing element 162 continues to provide a force that presses at least the foot portion 174 against an adjacent portion of the annular portion 154 of the adjustment plate 136. Thus, the indicator gauge 160 may also be displaced within the one or more channels 180a, 180b in a similar direction as the adjustment plate 136, and more specifically in a direction that is generally away from the inside hub 124. Such displacement of the indicator gauge 160 may alter the axial position of the indicator portion 168 relative to the opening 186 in the cover 164, thereby altering which indicium on the indicator portion 168 may be viewable through the opening 186 in the cover 164. And as previously discussed, the particular indicium that is viewable through the opening 186 in the cover 164 may correspond to the thickness of the door 102 to which the lock chassis 110 is set to be installed. For example, referencing FIG. 8, as the indicator portion 168 is axially displaced away from the inside hub 124, the indicium viewable through the opening 186 in the cover may, depending on the particular circumstances, change from "1¾" inches, as shown in FIG. 9, to "2⅛" inches, as shown in FIG. 8.

While the invention has been described in connection with what is presently considered to be the most practical and preferred embodiment, it is to be understood that the invention is not to be limited to the disclosed embodiment(s), but on the contrary, is intended to cover various modifications and equivalent arrangements included within the spirit and scope of the appended claims, which scope is to be accorded the broadest interpretation so as to encompass all such modifications and equivalent structures as permitted under the law. Furthermore it should be understood that while the use of the word preferable, preferably, or preferred in the description above indicates that feature so described may be more desirable, it nonetheless may not be necessary and any embodiment lacking the same may be contemplated as within the scope of the invention, that scope being defined by the claims that follow. In reading the claims it is intended that when words such as "a," "an," "at least one" and "at least a portion" are used, there is no intention to limit the claim to only one item unless specifically stated to the contrary in the claim. Further, when the language "at least a portion" and/or "a portion" is used the item may include a portion and/or the entire item unless specifically stated to the contrary.

The invention claimed is:

1. An apparatus comprising:
an outside housing, at least a portion of the outside housing structured for placement within an opening in a door;
an adjustment plate structured for at least selective axial displacement about at least a portion of the outside housing, at least a portion of the adjustment plate structured for placement adjacent to an outer surface of the door; and
an indicator assembly having an indicator gauge and a biasing element, the indicator gauge having a plurality of indicium corresponding to a thickness of the door, at least a portion of the indicator gauge structured for axial displacement along one or more channels of the outside housing, the indicator gauge being axially displaced by the axial displacement of the adjustment plate, the biasing element structured to bias the indicator gauge against the adjustment plate.

2. The apparatus of claim 1, wherein the outside housing includes a slot, the slot structured to receive placement of at least a portion of a slide assembly of a lock assembly.

3. The apparatus of claim 2, wherein the adjustment plate is axially displaced about the outside housing via rotational displacement of at least an internal thread of the adjustment plate about an external thread of the outside housing.

4. The apparatus of claim 3, wherein the outside housing comprises a hub portion and an arm portion, the external thread being positioned about at least a portion of the hub portion, and wherein the one or more channels extend along at least portions of the hub portion and the arm portion.

5. The apparatus of claim 4, wherein the indicator gauge includes an indicator portion and a leg portion, the indicator portion including the plurality of indicium, the leg portion having an extension that is structured to extend from the one or more channels to contact at least a portion of the adjustment plate.

6. The apparatus of claim 5, wherein the indicator assembly further includes a cover, at least a portion of the cover structured to cover at least a portion of the one or more channels, the cover including an opening positioned for visual access of one of the plurality of indicium.

7. The apparatus of claim 6, wherein the cover has a first portion and a second portion, the first portion extending along a first longitudinal axis, the second portion extending along a second longitudinal axis, the second longitudinal axis being non-parallel to the first longitudinal axis, the first portion including the opening, the second portion structured to abut against a face portion of the arm portion.

8. An apparatus for setting a lock assembly to accommodate a thickness of a door, the apparatus comprising:
a housing, at least a portion of the housing sized for placement in an opening in the door;
an adjustment member structured for at least selective axial displacement about the housing, at least a portion of the adjustment member structured for placement adjacent to an outside portion of the door; and
an indicator assembly having an indicator gauge and a biasing element, the indicator gauge having an indicator portion and a leg portion, the indicator portion having a plurality of indicium corresponding to a thickness of the door, the indicator portion structured for axial displacement about the housing via the axial displacement of the adjustment member, the biasing element structured to bias at least a portion of the leg portion against the adjustment member.

9. The apparatus of claim 8, wherein the adjustment member is axially displaced about the housing via rotational displacement of at least an internal thread of the adjustment member about an external thread of the housing.

10. The apparatus of claim 9, wherein the indicator assembly further includes a cover, at least a portion of the cover structured to cover at least a portion of the indicator portion, the cover including an opening positioned to facilitate visual access of one of the plurality of indicium.

11. The apparatus of claim 10, wherein the cover has a first portion and a second portion, the first portion extending along a first longitudinal axis, the second portion extending along a second longitudinal axis, the second longitudinal axis being non-parallel to the first longitudinal axis, the first portion including the opening of the cover, the second portion structured to abut against a face portion of the arm portion.

12. The apparatus of claim 11, wherein housing includes a groove adjacent to a face portion of the housing, the groove sized to receive placement of the second portion of the cover.

13. The apparatus of claim 12, wherein the leg portion has a non-circular cross sectional shape that is dissimilar to a corresponding cross section shape of the indicator portion.

14. An apparatus comprising:
an outside housing sized for insertion in an opening in a door, the outside housing having a hub portion and at least one arm portion, the at least one arm portion having a first channel, the hub portion having a second channel;
an adjustment plate having a flange portion and an annular portion, the adjustment plate structured to threadingly engage the hub portion, the flange portion structured for placement adjacent to an outer surface of the door; and
an indicator assembly having an indicator gauge and a biasing element, the indicator gauge having an indicator portion and a leg portion, the indicator portion having a plurality of indicium corresponding to a thickness of the door, the indicator portion sized for slideable displacement within the first channel, the leg portion extending from the indictor portion and sized for slideable displacement within the second channel, the leg portion including an extension structured to extend above the second channel, the biasing element adapted for placement in the first channel, the biasing element structured to exert a biasing force to press at least the extension of the leg portion against a portion of the annular portion of the adjustment plate.

15. The apparatus of claim 14, wherein the indicator assembly includes a cover, at least a portion of the cover structured to cover at least a portion of the first channel, the cover having an opening sized to provide visual access to one of the plurality of indicium of the indicator portion.

16. The apparatus of claim 15, wherein an end of the indicator portion includes an aperture sized to receive insertion of at least a portion of the biasing element.

17. The apparatus of claim 16, wherein the hub portion includes an inner aperture, and wherein the at least one arm portion includes at least opposing first and second arm portions, the first and second arm portions spaced apart to provide a slot that is sized to receive placement of at least a portion of a slide and a slide clip.

18. The apparatus of claim 17, wherein the cover has a first portion and a second portion, the first portion extending along a first longitudinal axis, the second portion extending along a second longitudinal axis, the second longitudinal axis being non-parallel to the first longitudinal axis, the first portion including the opening of the cover, the second portion structured to abut against a face portion of the arm portion.

19. The apparatus of claim 18, wherein an end of the cover includes a recess sized to receive slideable insertion of at least a portion of the leg portion of the indicator gauge.

20. The apparatus of claim 19, wherein the leg portion has a non-circular cross sectional shape that is dissimilar to a corresponding cross section shape of the indicator portion.

\* \* \* \* \*